U S009225856B2

(12) United States Patent
Ohara

(10) Patent No.: US 9,225,856 B2
(45) Date of Patent: Dec. 29, 2015

(54) RELAY SERVER

(71) Applicant: BROTHER KOGYO KABUSHIKI KAISHA, Nagoya-shi, Aichi-ken (JP)

(72) Inventor: Kiyotaka Ohara, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 40 days.

(21) Appl. No.: 13/846,629

(22) Filed: Mar. 18, 2013

(65) Prior Publication Data

US 2013/0321859 A1    Dec. 5, 2013

(30) Foreign Application Priority Data

May 31, 2012    (JP) .................................. 2012-124820

(51) Int. Cl.
*H04N 1/00*    (2006.01)

(52) U.S. Cl.
CPC .... *H04N 1/00244* (2013.01); *H04N 2201/0094* (2013.01)

(58) Field of Classification Search
CPC .................. H04N 1/00244; H04N 2201/0094
See application file for complete search history.

(56) References Cited

U.S. PATENT DOCUMENTS

| 7,636,757 | B2 * | 12/2009 | Kemp | G06F 3/1228 |
| | | | | 358/1.15 |
| 8,019,066 | B1 * | 9/2011 | Efrati | G06Q 30/08 |
| | | | | 379/201.01 |
| 8,614,813 | B2 * | 12/2013 | Shiimori | G06Q 10/10 |
| | | | | 358/1.15 |
| 8,860,988 | B2 * | 10/2014 | Nanaumi | G06F 3/1205 |
| | | | | 358/1.1 |
| 8,913,274 | B2 * | 12/2014 | Watanabe | G06F 17/3089 |
| | | | | 358/1.15 |
| 8,925,017 | B1 * | 12/2014 | Howard, Jr. | H04N 21/4622 |
| | | | | 725/48 |
| 2002/0010785 | A1 * | 1/2002 | Katsukawa | G06Q 20/02 |
| | | | | 709/229 |
| 2002/0019786 | A1 * | 2/2002 | Gonzalez | G06Q 10/087 |
| | | | | 705/28 |
| 2003/0172001 | A1 * | 9/2003 | Yasuda | G06F 21/313 |
| | | | | 705/26.1 |
| 2005/0057773 | A1 * | 3/2005 | Buck | H04M 1/72525 |
| | | | | 358/1.15 |
| 2005/0105129 | A1 * | 5/2005 | Takahashi | H04N 1/00204 |
| | | | | 358/1.15 |
| 2006/0061803 | A1 * | 3/2006 | Oka | G06F 21/445 |
| | | | | 358/1.15 |
| 2006/0136566 | A1 * | 6/2006 | Ohara | H04N 1/00209 |
| | | | | 709/217 |
| 2007/0005748 | A1 * | 1/2007 | Ohara | H04L 29/06 |
| | | | | 709/223 |
| 2007/0019238 | A1 * | 1/2007 | Yamada | G06K 15/00 |
| | | | | 358/1.15 |
| 2007/0022469 | A1 * | 1/2007 | Cooper | H04K 1/00 |
| | | | | 726/3 |

(Continued)

FOREIGN PATENT DOCUMENTS

JP    2005-269250 A    9/2005
JP    2008-065501 A    3/2008

(Continued)

*Primary Examiner* — Ted Barnes
(74) *Attorney, Agent, or Firm* — Merchant & Gould PC

(57) ABSTRACT

A relay server may register combination information in an information memory. The combination information may include specific account information for a user who uses a communication device and first account information for the user. The first account information may be registered in the service providing server. The relay server may relay a data communication between the service providing server and the communication device by using the first account information included in the combination information including the specific account information in a case where the specific account information is received from the communication device after the combination information has been registered in the information memory. The data communication may be a communication for the communication device to receive a provision of a service from the service providing server.

8 Claims, 6 Drawing Sheets

(56) References Cited

U.S. PATENT DOCUMENTS

| | | | |
|---|---|---|---|
| 2007/0067831 A1* | 3/2007 | Matsuda | G06F 21/33 726/5 |
| 2007/0073876 A1* | 3/2007 | Shima | H04L 63/123 709/224 |
| 2008/0057907 A1* | 3/2008 | Yamakawa | G06F 21/31 455/411 |
| 2009/0323110 A1* | 12/2009 | Shiimori | G06Q 10/10 358/1.15 |
| 2011/0153727 A1 | 6/2011 | Li | |
| 2011/0242598 A1* | 10/2011 | Ohara | G06F 3/1205 358/1.15 |
| 2011/0242599 A1* | 10/2011 | Ohara | H04L 29/12113 358/1.15 |
| 2011/0276396 A1* | 11/2011 | Rathod | G06F 17/30867 705/14.49 |
| 2012/0019865 A1* | 1/2012 | Takahashi | G06F 3/1204 358/1.15 |
| 2012/0026539 A1* | 2/2012 | Ohara | G06F 3/1204 358/1.15 |
| 2012/0054768 A1* | 3/2012 | Kanna | G06F 9/5016 718/104 |
| 2012/0084402 A1 | 4/2012 | Ito et al. | |
| 2012/0113464 A1* | 5/2012 | Inoue | H04N 1/00151 358/1.15 |
| 2012/0117629 A1* | 5/2012 | Miyazawa | H04L 63/08 726/4 |
| 2012/0120437 A1* | 5/2012 | Nanaumi | G06F 3/1205 358/1.15 |
| 2012/0254368 A1* | 10/2012 | Sasaki | H04N 21/234309 709/219 |
| 2012/0262753 A1* | 10/2012 | Viccari | H04N 1/00307 358/1.15 |
| 2012/0268778 A1* | 10/2012 | Nakawaki | G06F 3/122 358/1.15 |
| 2012/0287469 A1* | 11/2012 | Tomiyasu | H04N 1/00244 358/1.15 |
| 2014/0129942 A1* | 5/2014 | Rathod | H04N 21/44222 715/720 |

FOREIGN PATENT DOCUMENTS

| | | |
|---|---|---|
| JP | 2011-129117 A | 6/2011 |
| JP | 2012-095280 A | 5/2012 |

* cited by examiner

Case That User Cannot Login

RELAY SERVER

CROSS-REFERENCE TO RELATED APPLICATION

This application claims priority to Japanese Patent Application No. 2012-124820, filed on May 31, 2012, the contents of which are hereby incorporated by reference into the present application.

TECHNICAL FIELD

The present specification teaches a relay server for relaying a data communication between a service providing server that provides a service and a communication device.

DESCRIPTION OF RELATED ART

An image processing device that uploads data to a server is known.

SUMMARY

A technique is taught that is capable of improving convenience when a user of a communication device uses a service providing server that provides a service (e.g., data storage).

A relay server configured to relay a data communication between a first service providing server that provides a first service and a specific communication device is taught herein. The relay server may comprise one or more processors; and an instruction memory that stores computer-readable instructions therein. The computer-readable instructions, when executed by the one or more processors, may cause the relay server to execute: registering first combination information in an information memory, the first combination information including specific account information for a specific user who uses the specific communication device and first account information for the specific user, the first account information being registered in the first service providing server; and relaying a first data communication between the first service providing server and the specific communication device by using the first account information included in the first combination information including the specific account information in a case where the specific account information is received from the specific communication device after the first combination information has been registered in the information memory, the first data communication being a communication for the specific communication device to receive a provision of the first service from the first service providing server.

Moreover, a control method, a computer program, and a non-transitory computer-readable storage medium storing computer-readable instructions for the relay server, are also novel and useful. Further, a communication system including the relay server and the specific communication device are also novel and useful.

EMBODIMENT

Configuration of Communication System

Figure 1:
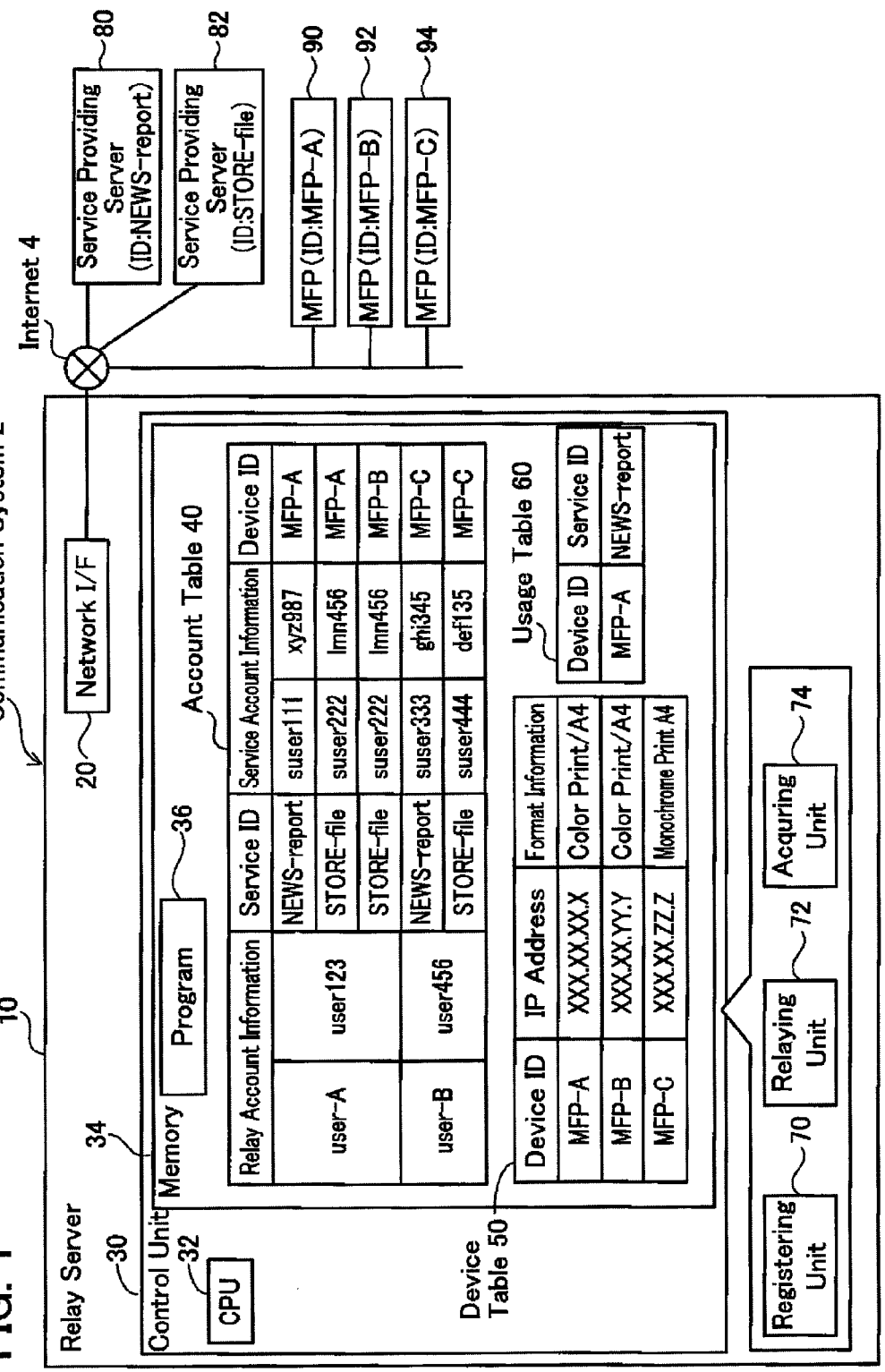
FIG. 1 shows a configuration of a communication system.

As shown in FIG. 1, a communication system 2 comprises a relay server 10, a plurality of service providing servers 80, 82, and a plurality of MFPs 90 to 94. The relay server 10, the plurality of service providing servers 80, 82 and the plurality of MFPs 90 to 94 are connected to an internet 4.

(Configuration of Relay Server 10)

The relay server 10 is installed by a manufacturer or a vendor of a communication apparatus (e.g., the MFP 90). The relay server 10 relays a data communication between the service providing servers 80, 82 and a communication apparatus (e.g., the MFP 90). The relay server 10 comprises a network interface 20 and a control unit 30. The network interface 20 is connected to the internet 4. The control unit 30 comprises a CPU 32 and a memory 34. The CPU 32 executes various processes in accordance with a program 36 stored in the memory 34. The functions of units 70 to 74 are realized by the CPU 32 executing processes in accordance with the program.

The memory 34 includes a memory such as a RAM, ROM, etc. Moreover, the memory 34 may include a HDD (abbreviation of: Hard Disk Drive). In addition to the program 36, the memory 34 stores an account table 40, a device table 50, and a usage table 60. The account table 40 is a table for storing information in which the following are associated: relay account information, service ID, service account information and device ID. The device table 50 is a table for storing information in which the following are associated: device ID, IP address, and format information. The usage table 60 is a table for storing information in which the following are associated: device ID and service ID. The manner of generating the tables 40, 50, 60 will be described in detail below.

(Configuration of Service Providing Servers 80, 82)

The service providing servers 80, 82 are known cloud servers such as, e.g., "Evernote (registered trademark)", "Google (registered trademark) Does", "PICASA (registered trademark)", "FACEBOOK (registered trademark)", etc. The service providing servers 80, 82 are capable of providing service to various communication apparatuses such as the MFP 90, etc. In order to receive the provision of service from the service providing servers 80, 82, a user of the communication apparatus need to register service account information in advance in the service providing servers 80, 82. The service account information includes a user ID and a password.

Upon receiving the service account information registered in the service providing server 80 from a communication apparatus (e.g., the MFP 90), the service providing server 80 provides data that represents news (called simply "news" below) to the communication apparatus. The service providing server 80 regularly or irregularly updates the news stored in the service providing server 80. Each time the news is updated, the service providing server 80 sends the news to the communication apparatus. A service ID "NEWS-report" that identifies the service of the service providing server 80 has been assigned in advance to the service providing server 80. Moreover, below, the service provided by the service providing server 80 is called a "news delivery service".

When the service account information is registered in the service providing server 82, the service providing server 82 generates a data folder associated with a user ID included in the service account information. Upon receiving the service account information registered in the service providing server 82 from a communication apparatus (e.g., the MFP 90), the service providing server 82 stores the data uploaded from the communication apparatus in the data folder (called "target data folder" below) associated with the user ID included in the service account information. Moreover, the service providing server 82 stores, in the target data folder, data associated with data ID (e.g., data name, uploading date information, etc.) assigned to the uploaded data. Further, upon receiving the data ID from the communication apparatus, the service providing server 82 sends, to the communication apparatus, the data which, from among the data stored in the target data folder, is associated with the data ID. A service ID "STORE-file" that identifies a service of the service providing server 82 is assigned in advance to the service providing server 82. Moreover, below, the service provided by the service providing server 82 is called a "data storing service".

(Configuration of MFPs 90, 92, 94)

The MFP 90 is communicably connected with an external device (e.g., the relay server 10) via the internet 4. The MFP 90 is capable of executing a display function, a print function, and a scan function. The display function is a function for displaying, on a displaying unit, an image represented by data received via the internet 4. The print function is a function for printing an image represented by data received via the internet 4 onto a print medium. The scan function is a function for reading a document set on a scan performing unit, and generating scan data. The MFPs 92, 94 have the same configuration as the MFP 90. A device ID ("MFP-A", "MFP-B" and "MFP-C") that identifies the MFP is assigned in advance to each of the MFPs 90, 92, 94. Moreover, the device ID is information assigned uniquely to each MFP, such as a MAC address, etc. of the MFPs 90, 92, 94.

(Communication Process Executed by Relay Server 10)

A communication process executed by the control unit 30 of the relay server 10 will be described with reference to FIG. 2. The control unit 30 executes the communication process repeatedly while the relay server 10 is providing a function (while the power is ON). An acquiring unit 74 monitors whether a device registering instruction is received from a communication apparatus (e.g., the MFP 90). Below, a case will be described in which the relay server 10 executes communication with the MFP 90. However, communication with another communication apparatus (e.g., the MFPs 92, 94, etc.) is the same.

When a user of the MFP 90 executes a predetermined operation on the MFP 90, the MFP 90 sends a device registering instruction to the relay server 10. The device registering instruction includes a device ID (i.e., MFP-A) of the MFP 90, an IP address (i.e., XXX.XX.XX.X) of the MFP 90, and format information of the MFP 90. The format information shows the data format which the MFP 90 is able to use in executing the print function. The data format is represented by the size of the print paper and the number of colors in printing which can be used in executing the print function.

When the acquiring unit 74 receives the device registering instruction from the MFP 90 (YES in S2), in S4 a registering unit 70 registers, in the device table 50, an association of the device ID, the IP address, and the format information included in the device registering instruction. An association of the device ID, the IP address, and the format information of the communication apparatus included in the device registering instruction is registered in the device table 50 each time a device registering instruction is received by the relay server 10. When the process S4 ends, the process proceeds to S6. On the other hand, in a case of not receiving a device registering instruction, S4 is skipped, and the process proceeds to S6.

In S6 the registering unit 70 monitors whether a service registering instruction is received from the MFP 90. For example, in a case of wishing to receive provision of a service of the service providing server 80, the user of the MFP 90 specifies using the MFP 90 the service ID of the service providing server 80 in the MFP 90. Next, the user of the MFP 90 inputs, into the MFP 90, the service account information to be registered in the service providing server 80. The MFP 90 sends the input service account information to the service providing server 80 that has the specified service ID. Upon receiving the service account information, the service providing server 80 registers an association of the user ID and password included in the service account information.

Next, the user of the MFP 90 inputs relay account information into the MFP 90. The relay account information includes a user ID and password. The user ID and password included in the relay account information is different from the user ID and password of the service account information. When the relay account information has been input to the MFP 90, the MFP 90 sends a service registering instruction to the relay server 10. The service registering instruction includes the input relay account information (e.g., user ID: user-A, and password: user123), the input service account information (e.g., user ID: suser111, and password: xyz987), the specified service ID (e.g., NEWS-report), and the device ID of the MFP 90 (i.e., MFP-A).

Upon receiving the service registering instruction from the MFP 90, in S8 the registering unit 70 registers, in the account table 40, combination information that includes the relay account information, the service account information, the service ID, and the device ID of the MFP 90 that is included in the service registering instruction. Moreover, in a case where the relay account information included in the service registering instruction is already registered in the account table 40, the service account information, the service ID, and the device ID of the MFP 90 included in the service registering instruction is registered in the account table 40 in association with the registered relay account information. When S8 ends, the process proceeds to S10. On the other hand, in a case where a service registering instruction is not received, S8 is skipped, and the process proceeds to S10.

In S10 the control unit 30 monitors whether a login is executed by a communication apparatus. Specifically, the control unit 30 monitors whether login information is received from a communication apparatus. The login information includes the relay account information (the user ID and password) and the device ID of the communication apparatus. In a case where the login is executed (YES in S10), the process proceeds to S12, and in a case where the login is not executed (NO in S10), the process proceeds to S24.

In S12 the control unit 30 executes an authentication process. The authentication process is a process determining whether combination information (called "target combination information" below) that includes the relay account information (the user ID and password) and the device ID included in the login information is registered in the account table 40. In a case where the target combination information is registered in the account table 40, the control unit 30 determines that authentication succeeded (YES in S12), and the process proceeds to S14. On the other hand, in a case where the target combination information is not registered in the account table 40, the control unit 30 determines that authentication failed (NO in S12), and the process proceeds to S22. In S22 the control unit 30 sends information indicating authentication failure to the communication apparatus that is the sending source of the login information, and the process returns to S2.

In S14 the control unit 30 sends a service list to the communication apparatus that is the sending source of the login information. Below, a case will be described in which the communication apparatus that is the sending source of the login information is the MFP 90. The control unit 30 specifies the target combination information from the account table 40. Moreover, in a case where a plurality of target combination information is registered in the account table 40, the plurality of target combination information is specified. Next, the control unit 30 extracts the service ID included in the specified target combination information. Thereupon, the control unit 30 generates a service list that includes the one or more service IDs, and sends the service list to the MFP 90.

Upon receiving the service list, the MFP 90 displays the one or more service IDs included in the service list on a displaying unit of the MFP 90. The user of the MFP 90 can select one service ID from among the one or more service IDs. The MFP 90 sends the service ID selected by the user to the relay server 10.

In S16 the control unit 30 monitors whether a service is selected by the user of the MFP 90. In a case where a service ID has not been received from the MFP 90 even though a predetermined period (e.g., 5 minutes) has elapsed since the service list was sent in S14, the control unit 30 determines that a service has not been selected by the user (NO in S16), and the process returns to S2. On the other hand, in a case where the service ID (called "target service ID" below) from the MFP 90 is received within the predetermined period since the service list was sent, the control unit 30 determines that a service was selected by the user (YES in S16), and the process proceeds to S18.

In S18 a relaying unit 72 registers, in the usage table 60, an association of the device ID received in S10 and the target service ID. Next, in S20 the relaying unit 72 sends, to the service providing server that has the target service ID (e.g., the service providing server 80), the service account information included in the one target combination information that, from among the one or more target combination information, includes the target service ID. Further, in a case where the target service ID is the NEWS-report, in S20 the relaying unit 72 sends, to the service providing server that has the target service ID, the format information registered in the device table 50 in association with the device ID received in S10.

In a case where the service account information is sent to the service providing server 80, the service providing server 80 executes an authentication process upon receiving the service account information. In a case where the service account information is registered in the service providing server 80, the service providing server 80 determines that authentication succeeded. In a case of determining that authentication succeeded, the service providing server 80 sends the news stored in the service providing server 80 to the relay server 10. Moreover, in a case of determining that authentication failed, the service providing server 80 sends information indicating authentication failure to the relay server 10. In this case, the relay server 10 sends the information indicating authentication failure to the MFP 90. The MFP 90 outputs the information indicating authentication failure.

In a case where the service account information is sent to the service providing server 82, the service providing server 82 executes an authentication process the same as that of the service providing server 80 upon receiving the service account information. In a case of determining that authentication succeeded, the service providing server 82 allows the uploading of data to the target data folder and the downloading of data from within the target data folder. Moreover, in a case of determining that authentication failed, the service providing server 82 executes the same process as that of the service providing server 80.

In S24 the relaying unit 72 monitors whether data is received from a service providing server. In a case where data is received (YES in S24), the process proceeds to S26, and in a case where data is not received (NO in S24), the process proceeds to S30. In S26 the relaying unit 72 specifies the communication apparatus to which the received data is to be sent. Specifically, the relaying unit 72 specifies the device ID registered in the usage table 60 in association with the service ID (e.g., NEWS-report) of the service providing server that is the sending source of the data. In S28 the relaying unit 72 sends the received data to the communication apparatus that has the specified device ID, and the process proceeds to S30. The relaying unit 72 relays a data communication between a service providing server and a communication apparatus by receiving data from the service providing server and sending the data to the communication apparatus so that an image represented by data stored in the service providing server is output by the communication apparatus.

That is, in the case where the relay account information and the service ID are received (YES in S10, YES in S16) after the combination information has been registered in the account table 40 (S8), the relaying unit 72 sends the data from the service providing server to the communication apparatus by using the service account information included in the combination information that includes the relay account information and the service ID.

In S30 the relaying unit 72 monitors whether data is received from a communication apparatus (e.g., the MFPs 90 to 94, etc.). In a case where data is received (YES in S30), the process proceeds to S32, and in a case where the data is not received (NO in S30), the process returns to S2. In S32 the service providing server to which the received data is to be sent is specified. Specifically, the relaying unit 72 specifies the service ID registered in the usage table 60 in association with the device ID that is attached to the received data. Next, in S34 the relaying unit 72 sends the received data to the service providing server that has the specified service ID (e.g., the service providing server 82), and the process returns to S2. For example, the relaying unit 72 relays a data communication between a service providing server and a communication apparatus by receiving scan data from the communication apparatus and sending the scan data to the service providing server so that the scan data generated by the communication apparatus executing the scan function is stored in the service providing server.

Figure 3:
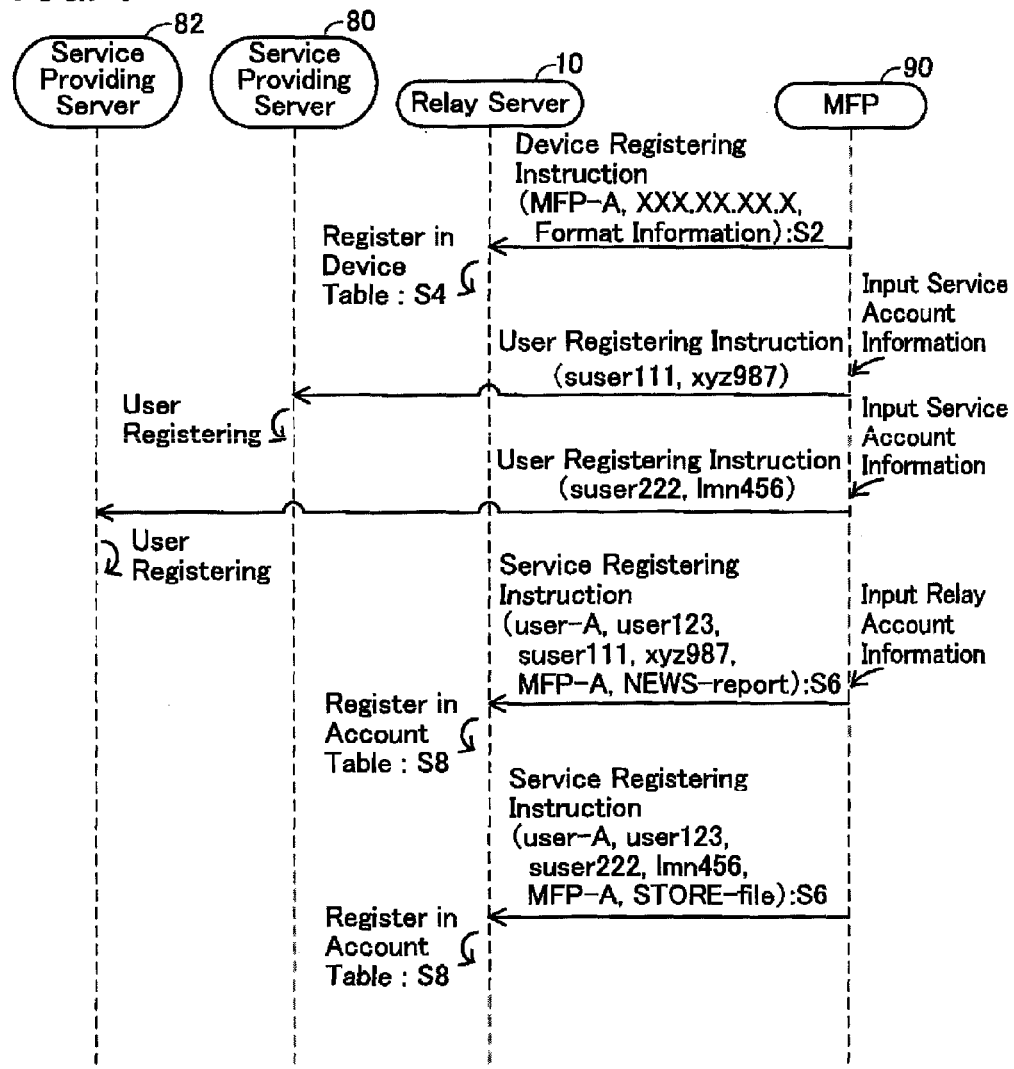
FIG. 3 shows a sequence view of a registration process.

(Registration Process of Servers 10, 80, 82: FIG. 3)

Processes of the servers 10, 80, 82 and the MFP 90 will be described with reference to FIG. 3 whereby, after the MFP 90 has connected to the internet 4, the user of the MFP 90 (called "the first user" below) comes to be in a state of being able to receive the provision of a service from each of the two service providing servers 80, 82 by using the MFP 90.

After the MFP 90 has connected to the internet 4, when the first user executes a predetermined operation, the MFP 90 sends a device registering instruction to the relay server 10. Upon receiving the device registering instruction (YES in S2 of FIG. 2), the relay server 10 registers, in the device table 50, an association of the device ID "MFP-A", the IP address "XXX.XX.XX.X" and the format information "color print/A4" included in the device registering instruction (S4 of FIG. 2).

Next, the MFP 90 sends a user registering instruction that includes service account information (i.e., user ID: suser111, and password: xyz987), input by the first user, to the service providing server 80 that has the service ID "NEWS-report" specified by the first user. Upon receiving the service account information, the service providing server 80 registers the service account information. Thereby, the first user can receive the provision of the news delivery service from the service providing server 80.

Similarly, the MFP 90 sends a user registering instruction that includes service account information (i.e., user ID: suser222, and password: lnm456), input by the first user, to the service providing server 82 that has the service ID "STORE-file" specified by the first user. Upon receiving the service account information, the service providing server 82 registers the service account information. Thereby, the first user can receive the provision of the data storing service from the service providing server 82.

Next, when the relay account information (i.e., user ID: user-A, and password: user123) is input from the first user, the MFP 90 sends a service registering instruction to the relay server 10 for each of the two service account information that were already sent. One of the service registering instructions includes the relay account information that was input, the service account information sent to the service providing server 80 (i.e., user ID: suser111, and password: xyz987), the device ID "MFP-A" of the MFP 90, and the service ID "NEWS-report". The other one of the user registering instructions includes the relay account information that was input, the service account information sent to the service providing server 82 (i.e., user ID: suser222, and password: lnm456), the device ID (i.e., MFP-A) of the MFP 90, and the service ID (i.e., STORE-file).

Each time the service registering instruction is received, the relay server 10 registers, in the account table 40, combination information in which the following are associated: the relay account information, the service account information, the device ID, and the service ID included in the service registering instruction. Consequently, a plurality of service account information, device IDs and service IDs are registered in combination with one relay account information in the account table 40.

Moreover, in a case where the first user wishes to receive the data storing service of the service providing server 82 by using the MFP 92, which is different from the MFP 90, the first user connects the MFP 92 to the internet 4, and inputs the service account information and the relay account information to the MFP 92. Consequently, the servers 10, 82 and the MFP 92 execute the same process as the servers 10, 82 and the MFP 90 of FIG. 3. Consequently, the device ID "MFP-B" of the MFP 92, the IP address "XXX.XX.YY.Y" of the MFP 92, and the format information "color print/A4" of the MFP 92 are registered in the device table 50. Further, combination information that includes the relay account information (i.e., user ID: user-A, and password: user123), the service account information (i.e., user ID: suser222, and password: lmn456), the device ID "MFP-B" of the MFP 92, and the service ID "STORE-file" is registered in the account table 40.

Further, in a case where a second user different from the first user wishes to receive the news delivery service and the data storing service by using the MFP 94 that is different from the MFPs 90, 92, the second user connects the MFP 94 to the internet 4, and inputs the service account information and the relay account information into the MFP 94. Consequently, the servers 10, 80 and the MFP 94 execute the same process as the servers 10, 80 and the MFP 90 of FIG. 3. Thereby, the device ID "MFP-C" of the MFP 94, the IP address "XXX.XX.ZZ.Z" of the MFP 94, and the format information "monochrome print/A4" of the MFP 94 are registered in the device table 50. Combination information that includes the relay account information (i.e., user ID: user-B, and password: user456), the service account information (i.e., user ID: suser333, and password: ghi345), the device ID "MFP-C" of the MFP 94, and the service ID "NEWS-report" is registered in the account table 40. Further, combination information that includes the relay account information (i.e., user ID: user-B, and password: user456), the service account information (i.e., user ID: suser444, and password: def135), the device ID "MFP-C" of the MFP 94, and the service ID "STORE-file" is registered in the account table 40.

Figure 4:
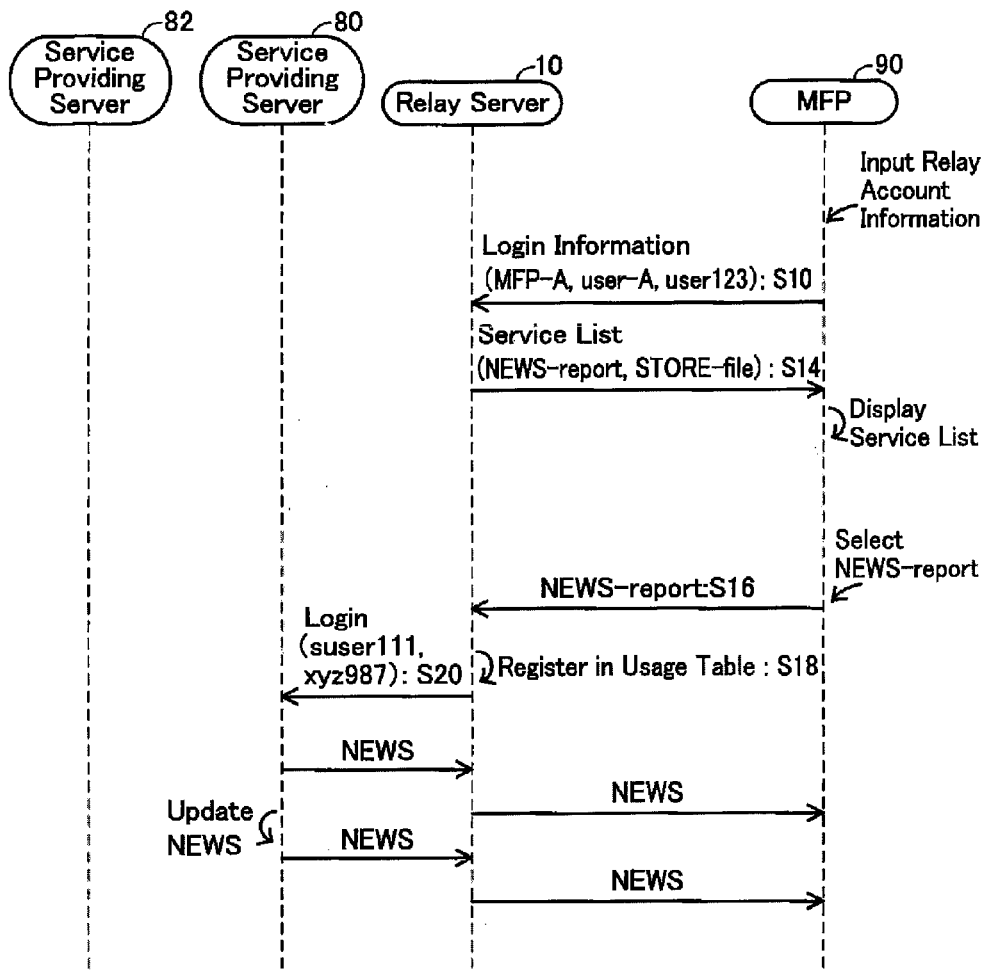
FIG. 4 shows a sequence view of a case where an MFP receives provision of a news delivery service.

(Case for Receiving Provision of News Delivery Service: FIG. 4)

Next, processes of the servers 10, 80 and the MFP 90, which are executed when the first user receives the provision of the news delivery service from the service providing server 80 by using the MFP 90, will be described.

The first user inputs the relay account information (i.e., user ID: user-A, and password: user123) to the MFP 90. The MFP 90 sends, to the relay server 10, login information that includes the relay account information that was input and the device ID of the MFP 90.

Upon receiving the login information (S10 of FIG. 2), the relay server 10 executes an authentication process. In the case where authentication succeeded (i.e., in the case where the target combination information is being stored in the account table 40), the relay server 10 sends a service list to the MFP 90. Specifically, the relay server 10 specifies the target combination information from the account table 40. Next, the relay server 10 extracts the service IDs (i.e., NEWS-report and STORE-file) included in the target combination information. The relay server 10 generates the service list that includes the extracted service IDs (i.e., NEWS-report and STORE-file), and sends the service list to the MFP 90 (S14 of FIG. 2).

Upon receiving the service list, the MFP 90 displays the received service list on the displaying unit. The MFP 90 sends, to the relay server 10, the service ID "NEWS-report" selected by the first user from within the service list.

Figure 2:
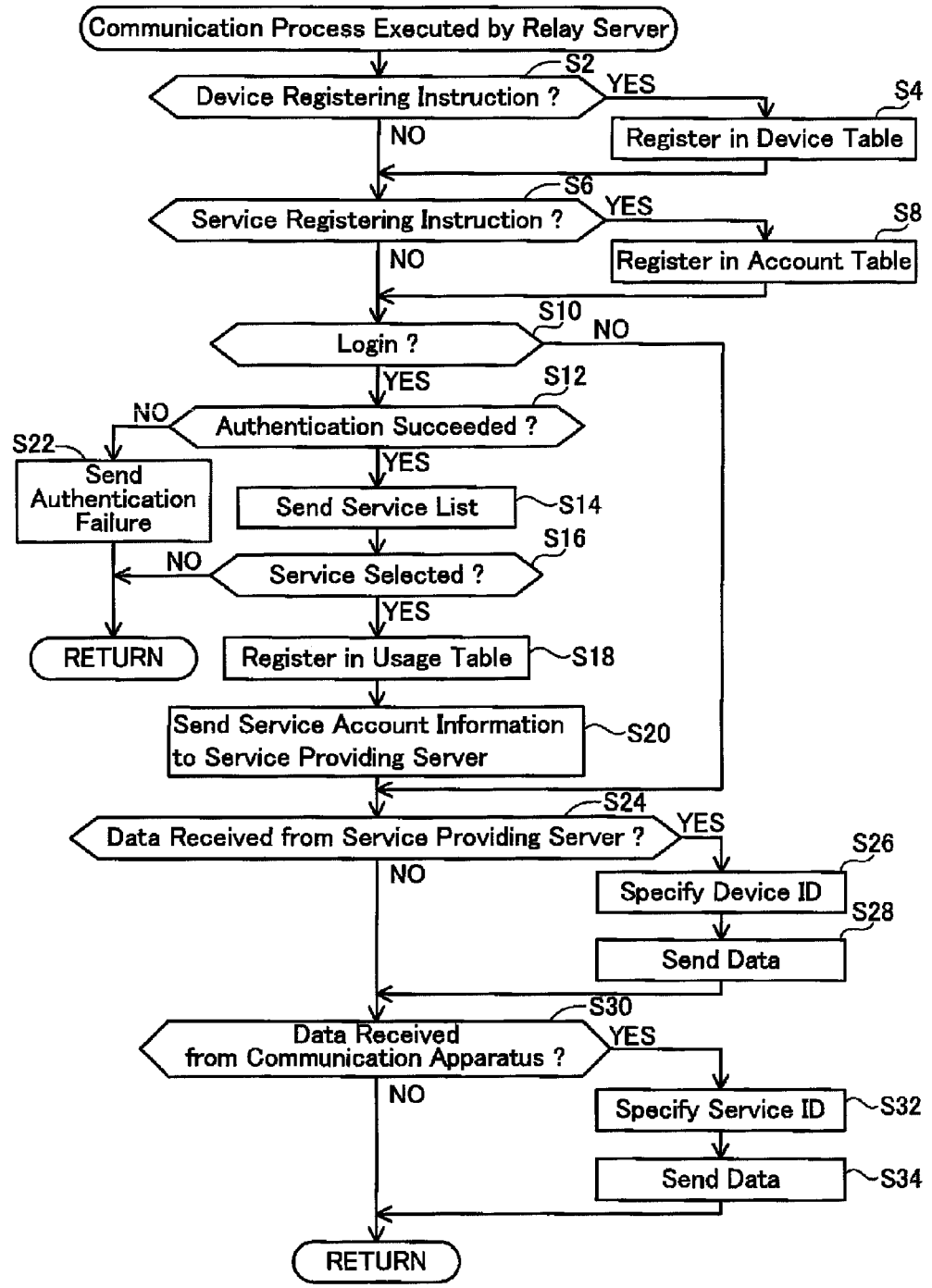
FIG. 2 shows a communication process executed by a relay server.

Upon receiving the service ID "NEWS-report" (S16 of FIG. 2), the relay server 10 registers an association, in the usage table 60, of the device ID "MFP-A" of the MFP 90 and the service ID "NEWS-report" (S18 of FIG. 2). Next, the relay server 10 sends, to the service providing server 80, the service account information (i.e., user ID: suser111, and password: xyz987) included in the target combination information which, from among the target combination information, includes the service ID "NEWS-report" (S20 of FIG. 2). Further, the relay server 10 sends the format information "color print/A4" of the MFP 90 stored in the device table 50 to the service providing server 80 (S20 of FIG. 2).

Upon receiving the service account information, the service providing server 80 executes an authentication process. In the case where the authentication process succeeded, the service providing server 80 sends news having a data format representing an A4 size color image to the relay server 10 by using the format information of the MFP 90. Moreover, in the case where the data format of the news being stored in the service providing server 80 is a data format that does not conform to the format information, the service providing server 80 sends news, to the relay server 10, that is generated by converting the data format. Upon receiving the news from the service providing server 80, the relay server 10 specifies the device ID "MFP-A" associated with the service ID "NEWS-report" of the usage table 60 (S26 of FIG. 2). Thereupon, the relay server 10 sends the received news to the MFP 90 that has the device ID "MFP-A". Upon receiving the news, the MFP 90 executes a color print, onto A4 print paper, of the image represented by the received news.

In this configuration, by using the format information, the relay server 10 can send news having a data format indicated by the format information to the MFP 90. According to this configuration, the relay server 10 can send, to the MFP 90, data that has a data format that the MFP 90 is capable of printing. Consequently, the situation can be avoided in which an image represented by the news cannot be printed even though the MFP 90 has received the news.

The service providing server 80 sends news to the relay server 10 each time the news is updated. The relay server 10 sends the received news to the MFP 90 each time the news is received from the service providing server 80. The MFP 90 executes a color print of an image represented by the received news onto A4 print paper each time the news is received.

In the above configuration, the relay server 10 relays a data communication between the service providing server 80 and the MFP 90 by receiving news from the service providing server 80 and sending the news to the MFP 90 so that an image represented by the news that is being stored in the service providing server 80 is printed by the MFP 90. According to this configuration, the MFP 90 can print an image represented by the news that is being stored in the service providing server 80.

Figure 5:
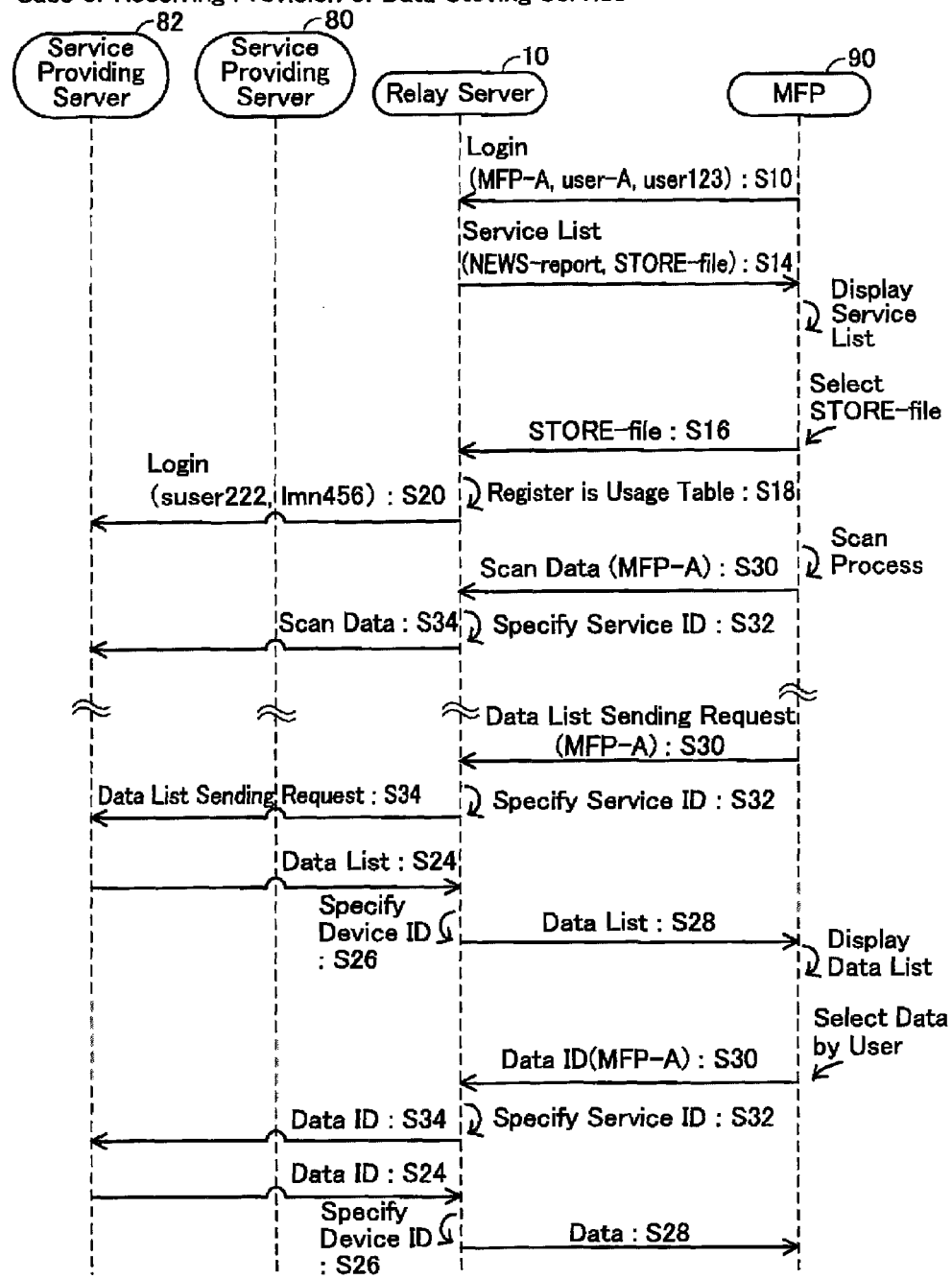
FIG. 5 shows a sequence view of a case where the MFP receives provision of a data storing service.

(Case for Receiving Provision of Data Storing Service: FIG. 5)

Next, processes of the servers 10, 82 and the MFP 90, which are executed when the first user receives the provision of the data storing service from the service providing server 82 by using the MFP 90, will be described.

The processes executed by the MFP 90 until displaying the service list are the same as the processes of FIG. 4. The MFP 90 sends the service ID "STORE-file", selected by the first user from within the service list, to the relay server 10.

Upon receiving the service ID "STORE-file" (S16 of FIG. 2), the relay server 10 registers, in the usage table 60, an association of the device ID "MFP-A" of the MFP 90 and the service ID "STORE-file" (S18 of FIG. 2). Next, the relay server 10 sends, to the service providing server 82, the service account information (i.e., user ID: suser222, and password: lmn456) included in the target combination information which, from among the target combination information, includes the service ID "STORE-file" (S20 of FIG. 2). Moreover, the relay server 10 does not send, to the service providing server 82, the format information "color print/A4" of the MFP 90 that is being stored in the device table 50.

Upon receiving the service account information, the service providing server 82 executes an authentication process. In a case where the authentication process succeeded, the service providing server 82 allows the uploading of data to the target data folder and the downloading of data from within the target data folder.

The MFP 90 executes the scan function and generates scan data in accordance with an instruction of the first user. Next, the MFP 90 sends the generated scan data and the device ID "MFP-A" of the MFP 90 to the relay server 10. Upon receiving the scan data (S30 of FIG. 2), the relay server 10 specifies the service ID (S32 of FIG. 2). Next, the relay server 10 sends the scan data to the service providing server 82 that has the specified service ID (S34 of FIG. 2). Upon receiving the scan data, the service providing server 82 stores the received scan data in the target data folder.

In a case of wishing to download data that is being stored in the target data folder, the first user executes a predetermined operation on the MFP 90. The MFP 90 sends a data list sending request to the relay server 10 in accordance with the predetermined operation by the first user. The data list sending request includes the device ID "MFP-A" of the MFP 90.

Upon receiving the data list sending request (S30 of FIG. 2), the relay server 10 specifies the service ID (S32 of FIG. 2). Next, the relay server 10 sends the data list sending request to the service providing server 82 that has the specified service ID (S34 of FIG. 2).

Upon receiving the data list sending request, the service providing server 82 generates a data list that includes the data ID of one or more data that is being stored in the target data folder. Next, the service providing server 82 sends the generated data list to the relay server 10.

Upon receiving the data list (YES in S24 of FIG. 2), the relay server 10 specifies the device ID from the usage table 60 (S26 of FIG. 2). Next, the relay server 10 sends the data list to the MFP 90 that has the specified device ID (S28 of FIG. 2).

Upon receiving the data list, the MFP 90 displays the received data list on the displaying unit. By operating the MFP 90, the first user can select one data ID from among the data ID included in the data list. In a case where one data ID was selected by the first user, the MFP 90 sends the selected data ID and the device ID (i.e., MFP-A) of the MFP 90 to the relay server 10. Upon receiving the data ID (S30 of FIG. 2), the relay server 10 specifies the service ID (S32 of FIG. 2). Next, the relay server 10 sends the data ID to the service providing server 82 that has the specified service ID (S34 of FIG. 2).

Upon receiving the data ID, the service providing server 82 specifies the data identified by the received data ID from among the one or more data that is being stored in the target data folder. Next, the service providing server 82 sends the specified data to the relay server 10. Upon receiving the data (YES in S24 of FIG. 2), the relay server 10 specifies the device ID from the usage table 60 (S26 of FIG. 2). Next, the relay server 10 sends the data to the MFP 90 that has the specified device ID (S28 of FIG. 2). Upon receiving the data, the MFP 90 displays an image represented by the received data on the displaying unit.

In this configuration, the relaying unit 72 relays a data communication between the service providing server 82 and the MFP 90 by receiving the scan data from the MFP 90 and sending the scan data to the service providing server 82 so that the scan data generated by the MFP 90 executing a scan is stored in the service providing server 82. According to this configuration, the MFP 90 can store the scan data in the service providing server 82. Consequently, the MFP 90 does not need to store the generated scan data. Thereby, the MFP 90 does not need to be provided with a memory having a large storage capacity for storing the scan data.

Figure 6:
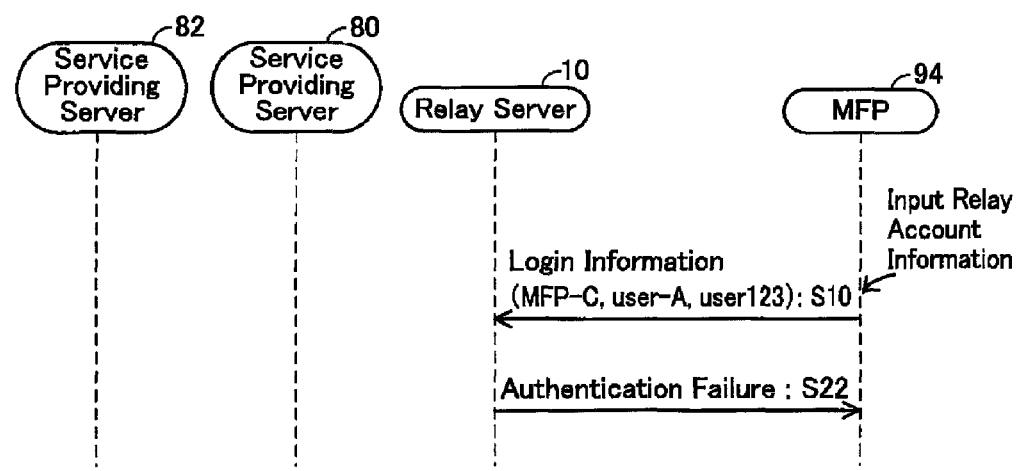
FIG. 6 shows a sequence view of a case where a user cannot log in to the MFP.

(Case that User Cannot Log in: FIG. 6)

The first user inputs the relay account information (i.e., user ID: user-A, and password: user123) to the MFP 94. The MFP 94 sends, to the relay server 10, the login information that includes the relay account information that was input and the device ID (i.e., MFP-C) of the MFP 94.

Upon receiving the login information (S10 of FIG. 2), the relay server 10 executes an authentication process. Combination information that includes the relay account information (i.e., user ID: user-A, and password: user123) and the device ID (i.e., MFP-C) of the MFP 94 has not been registered in the account table 40. In this case, the relay server 10 sends authentication failure to the MFP 90 (S22 of FIG. 4).

In this configuration, in a case where login information that includes relay account information and a device ID not registered in the account table 40 is received from the MFP 94 after the combination information has been registered in the account table 40, the relaying unit 72 does not relay a data communication between the service providing servers 80, 82 and the MFP 94. According to this configuration, in a case where relay account information (i.e., user ID: user-A, and password: user123) is received from the MFP 94, which is not the MFP 90, the relay server 10 does not need to execute a data communication between the service providing server 80 and the MFP 94. Consequently, the communication apparatuses from which the first user receives provision of a service can be restricted.

Advantageous Effects of Present Embodiment

According to the configuration of the present embodiment, the MFP 90 can receive the provision of a service from the service providing servers 80, 82 by sending the relay account information to the relay server 10. Consequently, the first user does not need to memorize the service account information registered in the service providing servers 80, 82. According to this configuration, convenience when the first user uses the service providing servers 80, 82 can be increased.

That is, if the first user memorizes one relay account information, the first user can receive the provision of a service from the differing service providing servers 80, 82 by using the MFP 90 even without having stored two service account information registered in the two service providing servers 80, 82. According to this configuration, convenience when the first user uses the service providing servers 80, 82 can be increased.

Further, according to the configuration of the present embodiment, it is not necessary to store the service account information in the MFP 90. That is, the first user can receive the provision of a service from the service providing server without having stored the service account information in the MFP 90. Thereby, the memory usage of the MFP 90 can be reduced. Further, even if the first user is to receive the provision of a plurality of services by using the MFP 90, the memory capacity of the MFP 90 does not need to be increased.

(Corresponding Relationships)

The service providing server 80 is an example of the "first service providing server", and the service providing server 82 is an example of the "second service providing server". Alternatively, it could also be said that the service providing server 80 is an example of the "second service providing server", and the service providing server 82 is an example of the "first service providing server".

In the former case, the news delivery service is an example of the "first service", and the data storing service is an example of the "second service". The service account information suser111 and xyz987 is an example of the "first account information", and the service ID NEWS-report is an example of the "first service identifying information". The service account information suser222 and lnm456 is an example of the "second account information", and the service ID STORE-file is an example of the "second service identifying information". The news sent from the service providing server 80 is an example of the "first data" and the "specific data".

In the latter case, the news delivery service is an example of the "second service", and the data storing service is an example of the "first service". The service account information suser111 and xyz987 is an example of the "second account information", and the service ID NEWS-report is an example of the "second service identifying information". The service account information suser222 and lnm456 is an example of the "first account information", and the service ID STORE-file is an example of the "first service identifying information". The data sent from the service providing server 82 to the MFP 90 is an example of the "first data", and the scan data sent from the MFP 90 to the service providing server 82 is an example of the "second data".

The MFP 90 is an example of the "specific communication device". The relay account information is an example of the "specific account information".

(Variants)

(1) In the present embodiment, upon receiving the news from the service providing server 80 via the relay server 10, the MFP 90 executes the print function. However, upon receiving the news from the service providing server 80, the MFP 90 may display the news on the displaying unit. In the present variant, display is an example of "output".

(2) In the present embodiment, the acquiring unit 74 receives a data format according to which the print function can be executed, such as "color print/A4", etc., from the MFP 90, etc. as the format information. However, the acquiring unit 74 may receive data format information (e.g., jpeg (abbreviation of: Joint Photographic Experts Group)), according to which the MFP 90, etc. can execute the print function, from the MFP 90, etc., as the format information. In this case, the relaying unit 72 may send data having a format indicated by the format information to the MFP 90, etc.

(3) In the present embodiment, the relaying unit 72 sends the format information to the service providing server that has the target service ID. However, the relaying unit 72 may not send the format information to the service providing server that has the target service ID. In this case, the relaying unit 72 may determine whether the data received from the service providing server has a data format indicated by the format information. In the case where the received data has a data format indicated by the format information, the relaying unit 72 may send the received data to a communication apparatus (e.g., the MFP 90). On the other hand, in the case where the received data does not have a data format indicated by the format information, the relaying unit 72 may convert the data format of the received data to the data format indicated by the format information. The relaying unit 72 may send the converted data to a communication apparatus (e.g., the MFP 90). In the present variant, the relaying unit 72 has a configuration which "sends specific data having a specific data format to a specific communication device by using the format information".

(4) In the present embodiment, the acquiring unit 74 receives the format information from a communication apparatus. However, the acquiring unit 74 may receive, from the communication apparatus, type information indicating the type of communication apparatus. In the present variant, the relay server 10 may be storing, in advance, a type information table in which the type of communication apparatus and the format information are associated. The acquiring unit 74 may acquire, from the type information table, the format information associated with the type information received from the communication apparatus.

(5) The account table 40 may be stored in an external apparatus (e.g., an external HDD) connected to the relay server 10. In the present variant, the external apparatus is an example of the "storage unit".

(6) The service providing server may provide a service other than the news delivery service and the data storing service. For example, the service providing server may provide a homepage posting service that posts an image represented by data (image data, text data, etc.), which was uploaded to the service providing server, on a homepage of the service providing server. In the present variant, the homepage posting service is an example of the "first service".

(7) The communication system 2 need not comprise the service providing server 82. In this case, the service providing server 80 may provide the data storing service in addition to the news delivery service. In this case, the service providing server 80 may have a service ID for each type of service provided. In the present variant, the service providing server 80 is an example of the "first service providing server" and the "second service providing server".

(8) The "specific communication device" is not restricted to the MFPs 90, 92, 94 that are capable of executing the display function, print function, and scan function, but may be a printer capable of executing only the print function, or a scanner capable of executing only the scan function. Further, the "specific communication device" may be a PC, portable terminal, etc. capable of executing the display function. In general terms, the "specific communication device" may be any device capable of executing a data output function.

(9) In the above embodiments, the functions of the units 70 to 74 are realized by the CPU 32 of the relay server 10 executing processes according to software. Instead, at least one of the functions of the units 70 to 74 may be realized by hardware such as a logic circuit, etc.

The invention claimed is:

1. A relay server configured to relay a data communication between a plurality of service providing servers and a plurality of communication devices, the relay server comprising:
one or more processors; and
an instruction memory that stores computer-readable instructions therein, the computer-readable instructions, when executed by the one or more processors, causing the relay server to execute:
registering first combination information in an information memory, the first combination information including specific account information for a specific user, first account information for the specific user, first service identifying information for identifying a first service provided by a first service providing server of the plurality of service providing servers, and first device identifying information for identifying a first communication device of the plurality of communication devices, the specific account information used when the specific user uses each of the first communication device and a second communication device of the plurality of communication devices, the first account information being registered in the first service providing server;
registering second combination information in the information memory, the second combination information including the specific account information, second account information for the specific user, second service identifying information for identifying a second service provided by a second service providing server of the plurality of service providing servers, and the first device identifying information, the second account information being registered in the second service providing server, the second service providing server being different from the first service providing server;
registering third combination information in the information memory, the third combination information including the specific account information, third account information for the specific user, third service identifying information for identifying a third service provided by a third service providing server of the plurality of service providing servers, and second device identifying information for identifying the second communication device, the third account information being registered in the third service providing server;
receiving first login information including the specific account information and the first device identifying information from the first communication device;
sending a first service list to the first communication device, the first service list including the first service identifying information combined with the specific account information and the first device identifying information in the information memory and the second service identifying information combined with the specific account information and the first device identifying information in the information memory in a case where the first login information is received after the first combination information and the second combination information are registered in the information memory;
receiving from the first communication device the specific account information and the first service identifying information, included in the first service list, selected by the specific user on the first communication device;
relaying a first data communication between the first service providing server and the first communication device by using the first account information included in the first combination information in a case where the specific account information and the first service identifying information are received after the first combination information has been registered in the information memory, the first data communication being a communication for the first communication device to receive a provision of the first service from the first service providing server;
receiving from the first communication device the specific account information and the second service identifying information, included in the first service list, selected by the specific user on the first communication device;
relaying a second data communication between the second service providing server and the first communication device by using the second account information included in the second combination information in a case where the specific account information and the second service identifying information are received after the second combination information has been registered in the information memory, the second data communication being a communication for the first communication device to receive a provision of the second service from the second service providing server;
receiving second login information including the specific account information and the second device identifying information from the second communication device;
sending a second service list to the second communication device, the second service list including the third service identifying information combined with the specific account information and the second device identifying information in the information memory in a case where the second login information is received after the third combination information are registered in the information memory;
receiving from the second communication device the specific account information and the third service identifying information, included in the second service list, selected by the specific user on the second communication device; and
relaying a third data communication between the third service providing server and the second communication device by using the third account information included in the third combination information in a case where the specific account information and the third service identifying information are received after the third combination information has been registered in the information memory, the third data communication being a communication for the second communication device to receive a provision of the third service from the third service providing server.

2. The relay server according to claim 1, wherein
the above relaying the first data communication includes not relaying the first data communication in a case where the specific account information and device identifying information different from the first device identifying information are received from a communication device different from the first communication device after the first combination information has been registered in the information memory.

3. The relay server according to claim 1, wherein
the first data communication includes receiving first data from the first service providing server and sending specific data obtained by using the first data to the first communication device so that a first image represented by the first data stored in the first service providing server is outputted in the first communication device.

4. The relay server according to claim 3, wherein
the computer-readable instructions, when executed by the one or more processors, cause the relay server to further execute:
acquiring format information indicating a specific data format that is a data format that the first communication device is able to output, and
the above relaying the first data communication includes sending the specific data with the specific data format to the first communication device by using the format information.

5. The relay server according to claim 1, wherein
the first data communication includes receiving second data from the first communication device and sending the second data to the first service providing server so that the second data generated by the first communication device performing scanning is stored in the first service providing server.

6. The relay server according to claim 1, wherein
the computer-readable instructions, when executed by the one or more processors, cause the relay server to further execute:
receiving registering instruction from the first communication device, the registering instruction including the specific account information, the first account information, the first service identifying information, and the first device identifying information, wherein
the registering first combination information includes registering the first combination information using the specific account information, the first account information, the first service identifying information, and the first device identifying information included in the received registering instruction.

7. A relay server configured to relay a data communication between a plurality of service providing servers and a plurality of communication devices, the relay server comprising:
a registering unit configured to register:
first combination information in an information memory, the first combination information including specific account information for a specific user, first account information for the specific user, first service identifying information for identifying a first service provided by a first service providing server of the plurality of service providing servers, and first device identifying information for identifying a first communication device of the plurality of communication devices, the specific account information used when the specific user uses each of the first communication device and a second communication device of the plurality of communication devices, the first account information being registered in the first service providing server;
second combination information in the information memory, the second combination information including the specific account information, second account information for the specific user, and second service identifying information for identifying a second service provided by a second service providing server of the plurality of service providing servers, and the first device identifying information, the second account information being registered in the second service providing server, the second service providing server being different from the first service providing server;
third combination information in the information memory, the third combination information including the specific account information, third account information for the specific user, third service identifying information for identifying a third service provided by a third service providing server of the plurality of service providing servers, and second device identifying information for identifying the second communication device, the third account information being registered in the third service providing server;
a first receiving unit configured to receive first login information including the specific account information and the first device identifying information from the first communication device;
a second unit configured to send a first service list to the first communication device, the first service list including the first service identifying information combined with the specific account information and the first device identifying information in the information memory and the second service identifying information combined with the specific account information and the first device identifying information in the information memory in a case where the first login information is received after the first combination information and the second combination information are registered in the information memory;
a second receiving unit configured to receive from the first communication device the specific account information and one of the first service identifying information and the second service identifying information, included in the first service list, selected by the specific user on the first communication device; and
a relaying unit configured to relay:
a first data communication between the first service providing server and the first communication device by using the first account information included in the first combination information including the specific account information and the first service identifying information in a case where the specific account information and the first service identifying information, included in the service list, selected by the specific user on the first communication device are received from the first communication device after the first combination information has been registered in the information memory, the first data communication being a communication for the first communication device to receive a provision of the first service from the first service providing server; and
a second data communication by using the second account information included in the second combination information including the specific account information and the second service identifying information in a case where the specific account information and the second service identifying information, included in the service list, selected by the specific user on the first communication device are received from the first communication device after the second combination information has been registered in the information memory, the second data communication being a communication for the first communication device to receive a provision of the second service from the second service providing server; wherein the first receiving unit is further configured to receive second login information including the specific account information and the second device identifying information from the second communication device;

the sending unit is further configured to send a second service list to the second communication device, the second service list including the third service identifying information combined with the specific account information and the second device identifying information in the information memory in a case where the second login information is received after the third combination information are registered in the information memory;

the second receiving unit is further configured to receive from the second communication device the specific account information and the third service identifying information, included in the second service list, selected by the specific user on the second communication device; and the relaying unit is further configured to relay a third data communication between the third service providing server and the second communication device by using the third account information included in the third combination information in a case where the specific account information and the third service identifying information are received after the third combination information has been registered in the information memory, the third data communication being a communication for the second communication device to receive a provision of the third service from the third service providing server.

8. A non-transitory computer-readable storage medium storing computer-readable instructions for a relay server configured to relay a data communication between a plurality of service providing servers and a plurality of communication devices, the computer-readable instructions, when executed by one or more processors mounted on the relay server, causing the relay server to execute:

registering first combination information in an information memory, the first combination information including specific account information for a specific user, first account information for the specific user, first service identifying information for identifying a first service provided by a first service providing server of the plurality of service providing servers, and first device identifying information for identifying a first communication device of the plurality of communication devices, the specific account information used when the specific user uses each of the first communication device and a second communication device of the plurality of communication devices, the first account information being registered in the first service providing server;

registering second combination information in the information memory, the second combination information including the specific account information, second account information for the specific user, second service identifying information for identifying a second service provided by a second service providing server of the plurality of service providing servers, and the first device identifying information, the second account information being registered in the second service providing server, the second service providing server being different from the first service providing server;

registering third combination information in the information memory, the third combination information including the specific account information, third account information for the specific user, third service identifying information for identifying a third service provided by a third service providing server of the plurality of service providing servers, and second device identifying information for identifying the second communication device, the third account information being registered in the third service providing server;

receiving first login information including the specific account information and the first device identifying information from the first communication device;

sending a first service list to the first communication device, the first service list including the first service identifying information combined with the specific account information and the first device identifying information in the information memory and the second service identifying information combined with the specific account information and the first device identifying information in the information memory in a case where the first login information is received after the first combination information and the second combination information are registered in the information memory;

receiving from the first communication device the specific account information and the first service identifying information, included in the first service list, selected by the specific user on the first communication device;

relaying a first data communication between the first service providing server and the first communication device by using the first account information included in the first combination information in a case where the specific account information and the first service identifying information are received after the first combination information has been registered in the information memory, the first data communication being a communication for the first communication device to receive a provision of the first service from the first service providing server;

receiving from the first communication device the specific account information and the second service identifying information, included in the first service list, selected by the specific user on the first communication device;

relaying a second data communication between the second service providing server and the first communication device by using the second account information included in the second combination information in a case where the specific account information and the second service identifying information are received after the second combination information has been registered in the information memory, the second data communication being a communication for the first communication device to receive a provision of the second service from the second service providing server;

receiving second login information including the specific account information and the second device identifying information from the second communication device;

sending a second service list to the second communication device, the second service list including the third service identifying information combined with the specific account information and the second device identifying information in the information memory in a case where the second login information is received after the third combination information are registered in the information memory;

receiving from the second communication device the specific account information and the third service identifying information, included in the second service list, selected by the specific user on the second communication device; and relaying a third data communication between the third service providing server and the second communication device by using the third account information included in the third combination information in a case where the specific account information and the third service identifying information are received after the third combination information has been registered in the information memory, the third data communication being a communication for the second communication device to receive a provision of the third service from the third service providing server.

* * * * *